United States Patent
Hsu et al.

(10) Patent No.: US 9,091,104 B2
(45) Date of Patent: Jul. 28, 2015

(54) HINGE STRUCTURE AND ELECTRONIC DEVICE HAVING THE SAME

(71) Applicant: Wistron Corporation, New Taipei (TW)

(72) Inventors: Chia-Lung Hsu, New Taipei (TW); Po-Cheng Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 43 days.

(21) Appl. No.: 14/146,007

(22) Filed: Jan. 2, 2014

(65) Prior Publication Data
US 2015/0098175 A1 Apr. 9, 2015

(30) Foreign Application Priority Data
Oct. 9, 2013 (TW) .............................. 102136573 A (51) Int. Cl.
*E05D 11/08* (2006.01)
*E05D 5/02* (2006.01)
*G06F 1/16* (2006.01)
*E05D 7/086* (2006.01)

(52) U.S. Cl.
CPC *E05D 5/02* (2013.01); *E05D 7/086* (2013.01); *E05D 11/08* (2013.01); *E05D 11/082* (2013.01); *G06F 1/1681* (2013.01); *Y10T 16/5403* (2015.01); *Y10T 16/54038* (2015.01); *Y10T 16/5474* (2015.01)

(58) Field of Classification Search
CPC ....... E05D 11/08; E05D 11/082; E05D 7/086; E05D 7/06; Y10T 16/5403; Y10T 16/54038; Y10T 16/547; Y10T 16/5474; Y10T 16/53615
See application file for complete search history.

(56) References Cited

U.S. PATENT DOCUMENTS

| | | | | |
|---|---|---|---|---|
| 608,459 A * | 8/1898 | Judson | ............................. | 16/338 |
| 684,074 A * | 10/1901 | Luppert | ........................... | 16/342 |
| 2,608,713 A * | 9/1952 | Soss | ................................. | 16/337 |
| 3,239,874 A * | 3/1966 | Sperzel | ............................ | 16/338 |
| 5,943,738 A * | 8/1999 | Karfiol | ............................. | 16/342 |
| 6,154,359 A * | 11/2000 | Kamikakai et al. | ...... | 361/679.27 |
| 6,389,643 B1 * | 5/2002 | Lim et al. | ......................... | 16/271 |
| 7,520,027 B2 * | 4/2009 | Lu et al. | .......................... | 16/340 |
| 7,543,358 B2 * | 6/2009 | Lin et al. | .......................... | 16/342 |
| 7,669,287 B2 * | 3/2010 | Lee et al. | ......................... | 16/340 |
| 7,832,803 B2 * | 11/2010 | Cassaday | ........................ | 297/408 |
| 8,291,550 B2 * | 10/2012 | Yang | ............................... | 16/342 |
| 8,944,396 B2 * | 2/2015 | Mau et al. | ................... | 248/284.1 |
| 8,959,716 B2 * | 2/2015 | Hsu | .................................. | 16/302 |
| 2001/0027589 A1 * | 10/2001 | Uneme et al. | .................... | 16/337 |
| 2005/0028321 A1 * | 2/2005 | Rude | .............................. | 16/277 |
| 2007/0090249 A1 * | 4/2007 | Lu et al. | ...................... | 248/291.1 |
| 2007/0143962 A1 * | 6/2007 | Lu et al. | .......................... | 16/340 |

(Continued)

*Primary Examiner* — Jeffrey O Brien
(74) *Attorney, Agent, or Firm* — Jianq Chyun IP Office (57) ABSTRACT

A hinge structure includes a hinge, a first bracket, a second bracket and a third bracket. The first bracket and the second bracket are pivoted with each other through the hinge, wherein the second bracket has a first connecting portion. The third bracket has a second connecting portion, wherein the second connecting portion is rotatably connected to the first connecting portion. When the third bracket receives a force and wobbles, the second connecting portion rotates relatively to the first connecting portion, and a kinetic energy of the third bracket is consumed by a kinetic friction between the first connecting portion and the second connecting portion. In addition, an electronic device having the hinge structure is also provided.

12 Claims, 6 Drawing Sheets

(56) References Cited

U.S. PATENT DOCUMENTS

| | | | |
|---|---|---|---|
| 2008/0239635 A1* | 10/2008 | Chen | 361/681 |
| 2008/0258532 A1* | 10/2008 | Cassaday | 297/408 |
| 2009/0038116 A1* | 2/2009 | Hsu et al. | 16/240 |
| 2009/0083943 A1* | 4/2009 | Chen | 16/342 |
| 2009/0089977 A1* | 4/2009 | Chen | 16/374 |
| 2009/0144933 A1* | 6/2009 | Chen | 16/277 |
| 2009/0271948 A1* | 11/2009 | Wang | 16/340 |
| 2009/0320244 A1* | 12/2009 | Lin | 16/362 |
| 2010/0170064 A1* | 7/2010 | Huang et al. | 16/387 |
| 2010/0299879 A1* | 12/2010 | Yang | 16/387 |
| 2011/0072620 A1* | 3/2011 | Wang et al. | 16/342 |
| 2011/0107556 A1* | 5/2011 | Wang et al. | 16/382 |
| 2011/0232032 A1* | 9/2011 | Chu et al. | 16/221 |
| 2013/0219663 A1* | 8/2013 | Cai | 16/371 |
| 2014/0063750 A1* | 3/2014 | Mau et al. | 361/728 |
| 2014/0196254 A1* | 7/2014 | Song | 16/302 |
| 2014/0252181 A1* | 9/2014 | Mau et al. | 248/125.1 |
| 2014/0290008 A1* | 10/2014 | Hsu | 16/386 |
| 2014/0304947 A1* | 10/2014 | Wang | 16/325 |

\* cited by examiner

HINGE STRUCTURE AND ELECTRONIC DEVICE HAVING THE SAME

CROSS-REFERENCE TO RELATED APPLICATION

This application claims the priority benefit of Taiwan application serial no. 102136573, filed on Oct. 9, 2013. The entirety of the above-mentioned patent application is hereby incorporated by reference herein and made a part of this specification.

BACKGROUND OF THE INVENTION

1. Field of the Invention

The invention relates to a hinge structure and an electronic device having the hinge structure, and more particularly, to a hinge structure providing a damping effect and an electronic device having the hinge structure.

2. Description of Related Art

Advances in semiconductor devices and display technology lead to continuous development of electronic devices toward compactness, capabilities to perform multiple functions, and portability. Common portable electronic devices include tablet PCs, smart phones, notebook computers, and so forth. As an example, a common notebook computer typically consists of a main unit and a display screen, wherein the main unit and the display screen are pivoted with each other through a hinge structure. By means of relative rotation between the main unit and the display screen, a user closes the display screen to the main unit for convenient portability. When desiring to use the notebook computer, the user opens the display screen for convenient operation.

More and more notebook computers are equipped with a touch display screen. When the user operates the display screen by touching, their pressing force on the display screen tends to cause the display screen to wobble. The longer the duration of wobbling of the display screen, the more likely visual discomfort will occur to the user and the more difficult the operation will become.

SUMMARY OF THE INVENTION

The invention provides a hinge structure that reduces the duration of wobbling of an electronic device body.

The hinge structure of the invention includes a hinge, a first bracket, a second bracket and a third bracket. The first bracket and the second bracket are pivoted with each other through the hinge, wherein the second bracket has a first connecting portion. The third bracket has a second connecting portion, wherein the second connecting portion is rotatably connected to the first connecting portion. When the third bracket receives a force and wobbles relatively to the first bracket, the second connecting portion is adapted to rotate relatively to the first connecting portion to a limited extent, so that a wobbling kinetic energy of the third bracket is consumed by a kinetic friction of relative rotation between the first connecting portion and the second connecting portion.

An electronic device of the invention includes a first body, a second body and a hinge structure. The hinge structure includes a hinge, a first bracket, a second bracket and a third bracket. The first bracket and the second bracket are pivoted with each other through the hinge and are fixed respectively to the first body and the second body, wherein the second bracket has a first connecting portion. The third bracket is fixed to the second body and has a second connecting portion, wherein the second connecting portion is rotatably connected to the first connecting portion. When the second body receives a force and wobbles relatively to the first body, the second connecting portion is adapted to rotate relatively to the first connecting portion to a limited extent, so that a wobbling kinetic energy of the second body is consumed by a kinetic friction of relative rotation between the first connecting portion and the second connecting portion.

In an embodiment of the invention, one of the first connecting portion and the second connecting portion includes a hollow column, and another one of the first connecting portion and the second connecting portion includes a pillar. The pillar is rotatably inserted through the hollow column and in contact with an inner wall of the hollow column. When the second connecting portion rotates relatively to the first connecting portion, the kinetic friction is generated between the inner wall and the pillar.

In an embodiment of the invention, the hollow column has a slot, and the slot exposes a portion of the pillar.

In an embodiment of the invention, the hollow column has an end surface perpendicular to the inner wall, and the pillar has an end having a covering portion. The covering portion is located outside the hollow column and covers the end surface. When the second connecting portion rotates relatively to the first connecting portion, the kinetic friction is generated between the covering portion and the end surface.

In an embodiment of the invention, the first bracket and the second bracket are pivoted with each other through the hinge along a first rotation axis. The first connecting portion is rotatably connected to the second connecting portion along a second rotation axis. The first rotation axis is parallel to the second rotation axis.

In an embodiment of the invention, the second bracket has a first fixing portion and is fixed to the second body through the first fixing portion. The third bracket has a second fixing portion and is fixed to the second body through the second fixing portion. The first connecting portion and the second connecting portion are located between the first fixing portion and the second fixing portion.

In an embodiment of the invention, a distance between the second connecting portion and the first fixing portion is shorter than a distance between the second connecting portion and the second fixing portion.

In an embodiment of the invention, the second body has a top side and a bottom side opposite to each other. The first fixing portion, the first connecting portion and the second connecting portion are adjacent to the bottom side, and the second fixing portion is adjacent to the top side.

Based on the above, in the hinge structure of the invention, the second connecting portion of the third bracket is rotatably connected to the first connecting portion of the second bracket. When the first connecting portion and the second connecting portion rotate relatively to each other, the kinetic friction is generated between the first connecting portion and the second connecting portion, so that the first connecting portion and the second connecting portion are equivalent to a friction damper. Accordingly, when the second body and the third bracket of the electronic device receive a force and wobble, the kinetic friction of relative rotation between the first connecting portion and the second connecting portion serves to consume the kinetic energy of the second body and the third bracket. Thus, duration of wobbling of the second body of the electronic device is reduced, so that the second body comes to a standstill within a shorter time.

To make the above features and advantages of the invention more comprehensible, embodiments accompanied with drawings are described in detail as follows.

DETAILED DESCRIPTION OF DISCLOSED EMBODIMENTS

Figure 1:
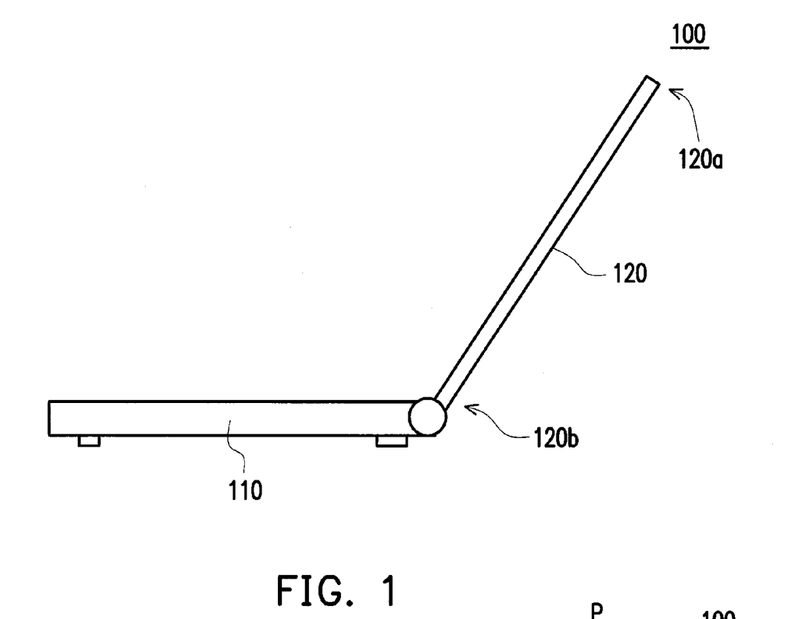
FIG. 1 is a schematic view of an electronic device according to an embodiment of the invention.
Figure 2:
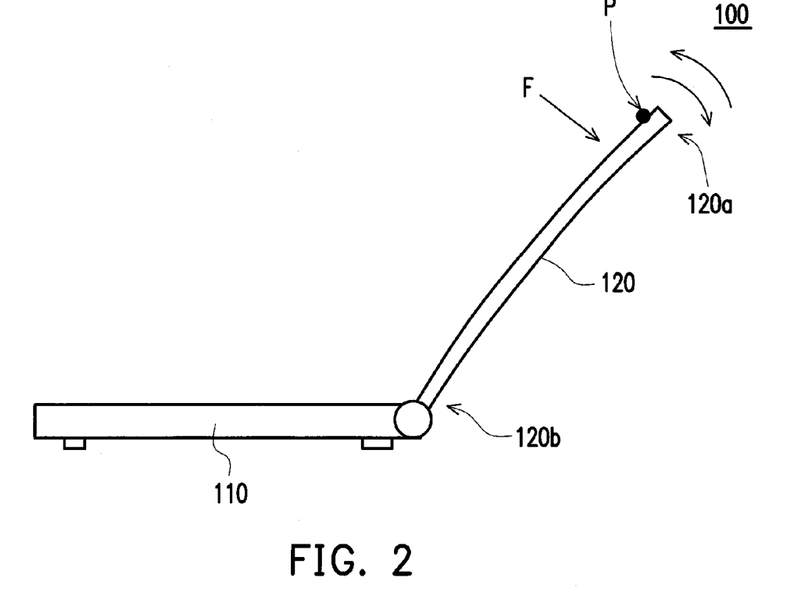
FIG. 2 is a schematic view illustrating that a second body in FIG. 1 receives a force and wobbles.

FIG. 1 is a schematic view of an electronic device according to an embodiment of the invention. FIG. 2 is a schematic view illustrating that a second body in FIG. 1 receives a force and wobbles. Referring to FIGS. 1 and 2, an electronic device 100 in the present embodiment is, for example, a notebook computer, and includes a first body 110 and a second body 120. The first body 110 and the second body 120 are respectively, for example, a main unit and a display screen of the notebook computer. The second body 120 is pivoted with the first body 110 and is adapted to be opened from or closed to the first body 110 (illustrated in the drawing that the second body 120 is opened from the first body 110). The second body is, for example, a display screen having a touch function. When a user performs touch operations on the second body 120, as shown in FIG. 2, the second body 120 receives an external force F and is deformed and wobbles.

Figure 3:
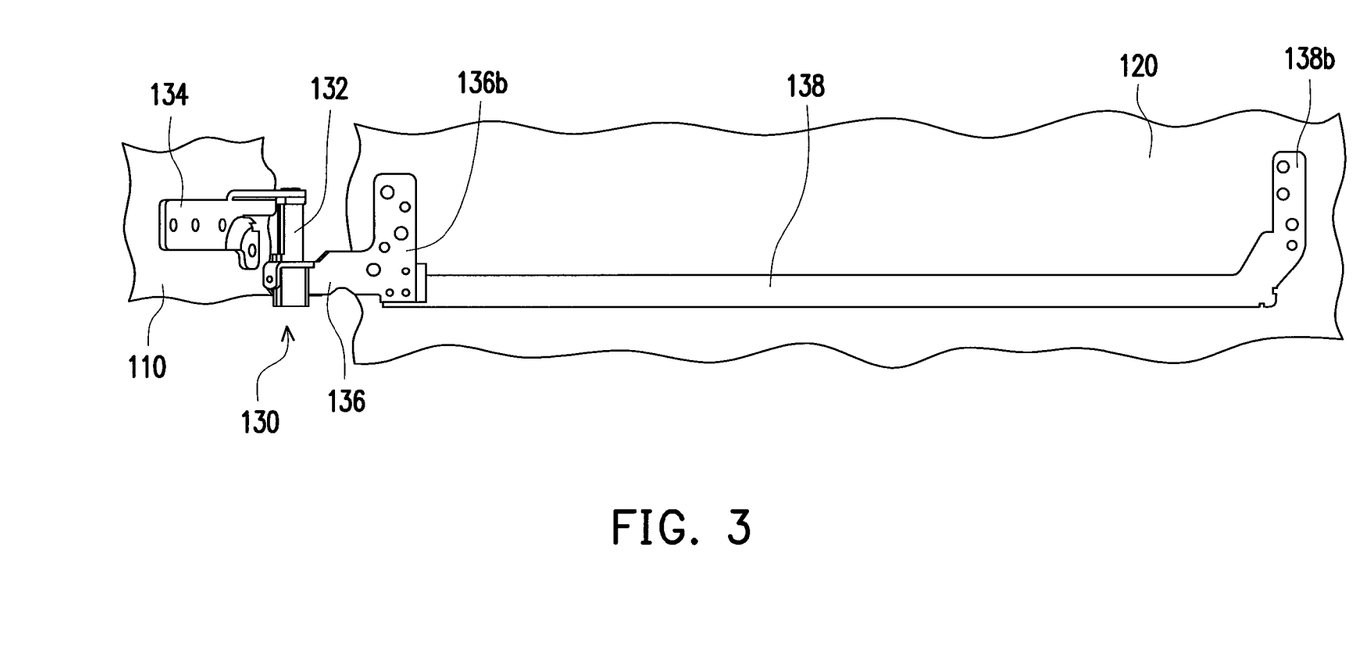
FIG. 3 is a schematic view of a hinge structure of the electronic device in FIG. 1.
Figure 4:
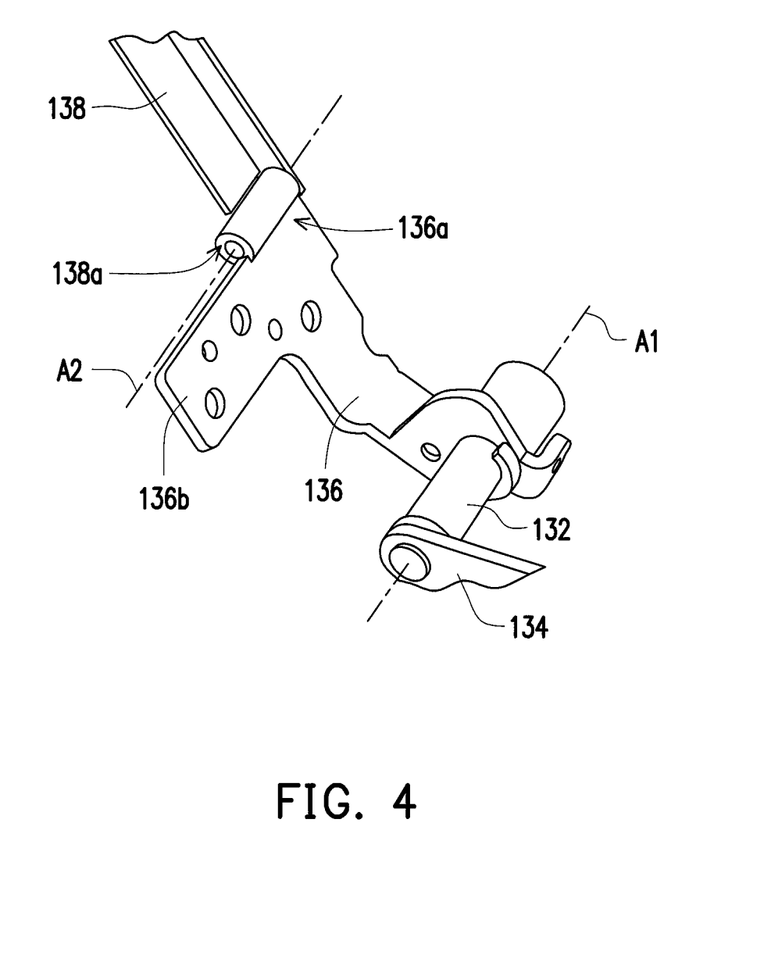
FIG. 4 is a partial three-dimensional view of the hinge structure in FIG. 3.

FIG. 3 is a schematic view of a hinge structure of the electronic device in FIG. 1. FIG. 4 is a partial three-dimensional view of the hinge structure in FIG. 3. For clarity of the drawings, the first body 110 and the second body 120 are only partially illustrated in FIG. 3, and are not illustrated in FIG. 4. Referring to FIGS. 3 and 4, the electronic device 100 further includes a hinge structure 130. The first body 110 and the second body 120 are pivoted with each other through the hinge structure 130. In detail, the hinge structure 130 includes a hinge 132, a first bracket 134, a second bracket 136 and a third bracket 138. The first bracket 134 and the second bracket 136 are pivoted with each other through the hinge 132 along a first rotation axis A1, and are fixed respectively to the first body 110 and the second body 120. The second bracket 136 has a first connecting portion 136a. The third bracket 138 is fixed to the second body 120 so as to increase a structural strength of the second body 120. The third bracket 138 has a second connecting portion 138a, wherein the second connecting portion 138a is rotatably connected to the first connecting portion 136a along a second rotation axis A2 parallel to the first rotation axis A1. When the second body 120 and the third bracket 138 receive the external force F shown in FIG. 2 and wobble, the second connecting portion 138a rotates relatively to the first connecting portion 136a along the second rotation axis A2. In other embodiments, the second rotation axis A2 may not be parallel to the first rotation axis A1.

With the above configuration, the first connecting portion 136a of the second bracket 136 and the second connecting portion 138a of the third bracket 138 are equivalent to a friction damper. Based on the above, when the second body 120 and the third bracket 138 of the electronic device 100 receive a force and wobble relatively to the first body 110 and the first bracket 134, a kinetic friction of relative rotation between the first connecting portion 136a and the second connecting portion 138a serves to consume a wobbling kinetic energy of the second body 120 and the third bracket 138. Accordingly, duration of wobbling of the second body 120 is reduced, so that the second body 120 comes to a standstill within a shorter time. In consequence, visual discomfort to the user resulting from the wobbling of the second body 120 is eliminated, and operation of the electronic device 100 becomes smoother.

Figure 5:
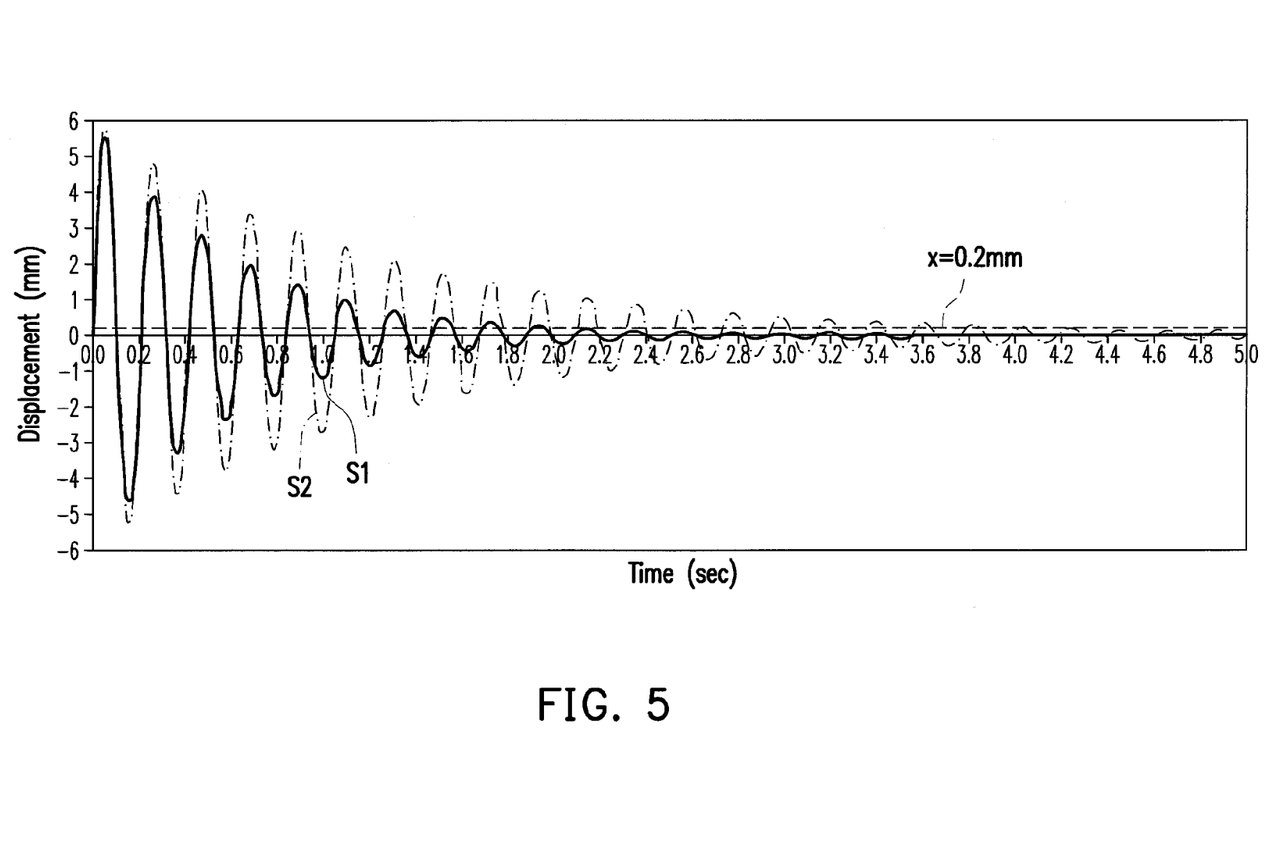
FIG. 5 is a curve diagram illustrating that a degree of wobbling of an electronic device body gradually decreases with time.

FIG. 5 is a curve diagram illustrating that a degree of wobbling of an electronic device body gradually decreases with time. In FIG. 5, displacement x(t) shown on the vertical axis is represented by an equation $$x(t) = Xe^{\frac{-C}{2M}t}\sin(t\sqrt{K/M}),$$

wherein X represents an initial displacement, C, K and M represent respectively damping, rigidity and mass of a structure, and t represents time shown on the horizontal axis. A curve S1 illustrates that the displacement of a position P on the second body 120 shown in FIG. 2 varies with the time. When the second bracket 136 and the third bracket 138 in the above embodiment are connected together in a rigid connecting manner (e.g. by riveting), and thus a damping effect cannot be provided by the first connecting portion 136a and the second connecting portion 138a, the variation in the displacement of the position P on the second body 120 with the time is shown by a curve S2. From the above equation, it is known that the greater the damping of the structure, the faster the convergence speed of the displacement of the body. With the above configuration of the first connecting portion 136a and the second connecting portion 138a, the damping of the structure may be obviously increased in a state where there is little variation in the rigidity and mass of the structure. Specifically, the displacement shown on the curve S2 in FIG. 5 converges to less than 0.2 mm only after the body wobbles for a duration of about 4.2 seconds. By the damping effect provided by the first connecting portion 136a and the second connecting portion 138a, it is possible that the displacement shown on the curve S1 in FIG. 5 converges to less than 0.2 mm after the body wobbles for a duration of about 2.1 seconds.

Referring to FIGS. 3 and 4, in the present embodiment, the second bracket 136 has a first fixing portion 136b and is fixed to the second body 120 through the first fixing portion 136b (e.g. by riveting). The third bracket 138 has a second fixing portion 138b and is fixed to the second body 120 through the second fixing portion 138b (e.g. by riveting). The first connecting portion 136a and the second connecting portion 138a are located between the first fixing portion 136b and the second fixing portion 138b, so as to ensure that the kinetic energy of wobbling of the second body 120 and the third bracket 138 is consumed by the kinetic friction between the first connecting portion 136a and the second connecting portion 138a. In detail, as shown in FIGS. 1 and 2, the second body 120 has a top side 120a and a bottom side 120b opposite to each other. As shown in FIGS. 3 and 4, the third bracket 138 has a bar-shaped structure. The second connecting portion 138a and the second fixing portion 138b are respectively located at two opposite ends of the third bracket 138. The first fixing portion 136b, the first connecting portion 136a and the second connecting portion 138a are adjacent to the bottom side 120b of the second body 120, and the second fixing portion 138b is adjacent to the top side 120a of the second body 120. When the second body 120 receives the external force F and is deformed and wobbles as shown in FIG. 2, the top side 120a of the second body 120 and the second fixing portion 138b adjacent to the top side 120a of the second body 120 have larger displacement, and the bottom side 120b of the second body 120 has smaller displacement. Therefore, the first connecting portion 136a and the second connecting portion 138a that are adjacent to the bottom side 120b of the second body 120 produce a sufficient but limited amount of relative rotation through wobbling of the second fixing portion 138b, so as to effectively provide the damping effect.

Figure 6:
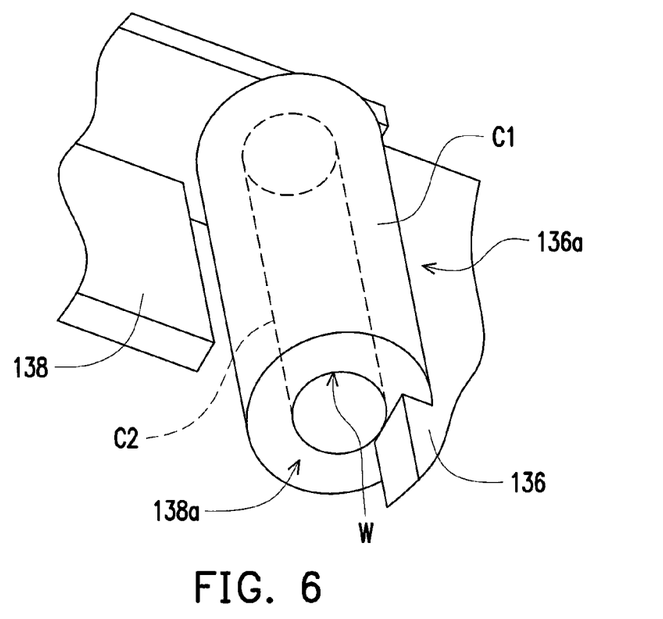
FIG. 6 is a partial enlarged view of the hinge structure in FIG. 4.

Connecting manners of the first connecting portion 136a and the second connecting portion 138a are described specifically below with reference to the drawings. FIG. 6 is a partial enlarged view of the hinge structure in FIG. 4. Referring to FIG. 6, in the present embodiment, the first connecting portion 136a includes a hollow column C1 (in a closed annular shape or C shape). The second connecting portion 138a includes a pillar C2. The pillar C2 is rotatably inserted through the hollow column C1 and in contact with an inner wall W of the hollow column C1. When the second connecting portion 138a rotates relatively to the first connecting portion 136a, the inner wall W and the pillar C2 perform a relative displacement and generate the kinetic friction, thus consuming the kinetic energy of wobbling of the second body 120 and the third bracket 138 by the kinetic friction.

In other embodiments, the magnitude of the kinetic friction between the first connecting portion and the second connecting portion may be properly adjusted according to design requirements. An example is given below.

Figure 7:
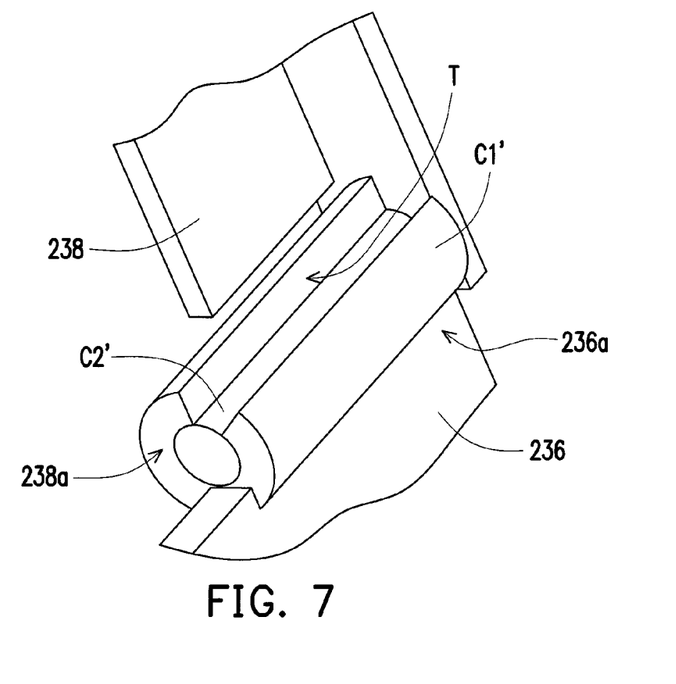
FIG. 7 is a partial enlarged view of a hinge structure according to another embodiment of the invention.

FIG. 7 is a partial enlarged view of a hinge structure according to another embodiment of the invention. Referring to FIG. 7, a first connecting portion 236a of a second bracket 236 and a second connecting portion 238a of a third bracket 238 in the present embodiment differ from the first connecting portion 136a of the second bracket 136 and the second connecting portion 138a of the third bracket 138 as shown in FIG. 6 in that a hollow column C1' of the first connecting portion 236a has a slot T. The slot T exposes a portion of a pillar C2' of the second connecting portion 238a, thereby reducing a contact area between the hollow column C1' and the pillar C2', so as to provide a smaller kinetic friction between the first connecting portion 236a and the second connecting portion 238a.

Figure 8:
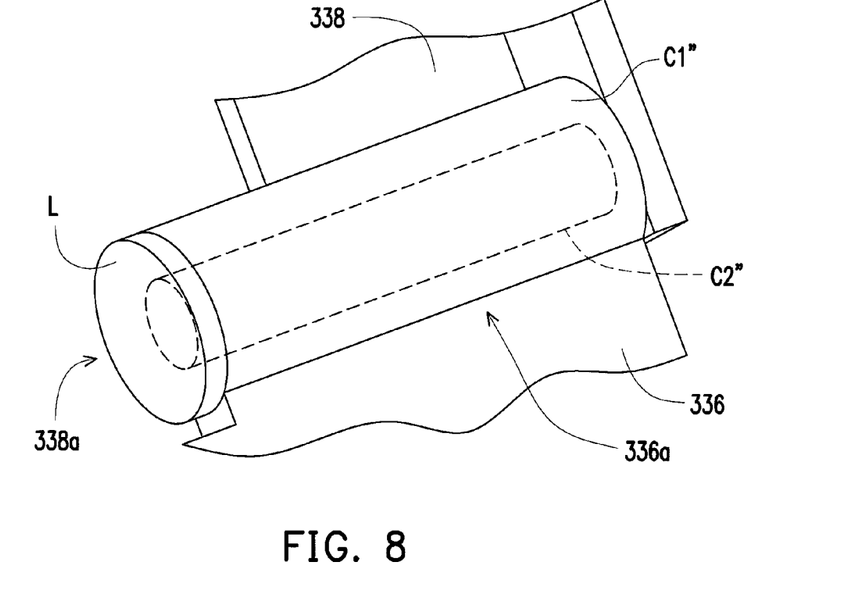
FIG. 8 is a partial enlarged view of a hinge structure according to another embodiment of the invention.
Figure 9:
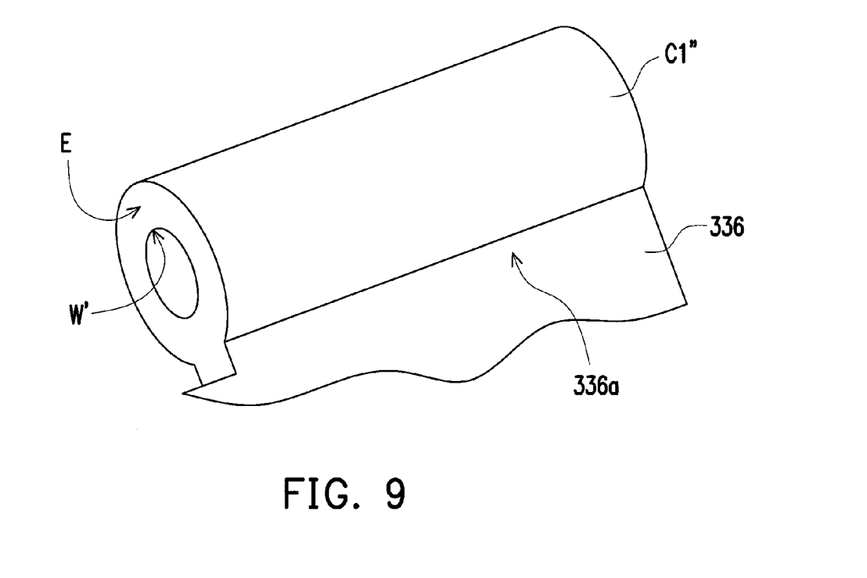
FIG. 9 is a schematic view of a second bracket in FIG. 8.

FIG. 8 is a partial enlarged view of a hinge structure according to another embodiment of the invention. FIG. 9 is a schematic view of a second bracket in FIG. 8. Referring to FIGS. 8 and 9, a first connecting portion 336a of a second bracket 336 and a second connecting portion 338a of a third bracket 338 in the present embodiment differ from the first connecting portion 136a of the second bracket 136 and the second connecting portion 138a of the third bracket 138 as shown in FIG. 6 in that a hollow column C1" of the first connecting portion 336a has an end surface E. The end surface E is perpendicular to an inner wall W' of the hollow column C1". A pillar C2" of the second connecting portion 338a has an end having a covering portion L. The covering portion L is located outside the hollow column C1" and covers the end surface E of the hollow column C1". When the second connecting portion 338a rotates relatively to the first connecting portion 336a, in addition to a kinetic friction generated between the pillar C2" and the inner wall W' of the hollow column C1", there is also a kinetic friction between the covering portion L of the pillar C2" and the end surface E of the hollow column C1", thus increasing the damping effect provided by the first connecting portion 336a and the second connecting portion 338a.

In summary, in the hinge structure of the invention, the second connecting portion of the third bracket is rotatably connected to the first connecting portion of the second bracket. When the first connecting portion and the second connecting portion rotate relatively to each other, the kinetic friction is generated between the first connecting portion and the second connecting portion, so that the first connecting portion and the second connecting portion are equivalent to a friction damper. Based on the above, when the second body and the third bracket of the electronic device receive a force and wobble, the kinetic friction between the first connecting portion and the second connecting portion consumes the kinetic energy of the second body and the third bracket. Accordingly, the duration of wobbling of the second body is reduced, so that the second body comes to a standstill within a shorter time. In consequence, the visual discomfort to the user resulting from the wobbling of the second body is eliminated, and the operation of the electronic device becomes smoother.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A hinge structure comprising:
a hinge;
a first bracket adapted to be fixed to a first body and a second bracket pivoted with each other through the hinge, wherein the second bracket has a first connecting portion; and
a third bracket having a second connecting portion, wherein the second connecting portion is rotatably connected to the first connecting portion, and when the third bracket receives a force and wobbles relatively to the first bracket, the second connecting portion is adapted to rotate relatively to the first connecting portion to a limited extent, so that a wobbling kinetic energy of the third bracket is consumed by a kinetic friction of relative rotation between the first connecting portion and the second connecting portion;
wherein the second bracket has a first fixing portion and is adapted to be fixed directly to a second body through the first fixing portion, the third bracket has a second fixing portion and is adapted to be fixed directly to the second body through the second fixing portion, and the first connecting portion and the second connecting portion are located between the first fixing portion and the second fixing portion.

2. The hinge structure of claim 1, wherein one of the first connecting portion and the second connecting portion comprises a hollow column, another one of the first connecting portion and the second connecting portion comprises a pillar, the pillar is rotatably inserted through the hollow column and in contact with an inner wall of the hollow column, and when the second connecting portion rotates relatively to the first connecting portion, the kinetic friction is generated between the inner wall and the pillar.

3. The hinge structure of claim 2, wherein the hollow column has a slot, and the slot exposes a portion of the pillar.

4. The hinge structure of claim 2, wherein the hollow column has an end surface perpendicular to the inner wall, the pillar has an end having a covering portion, the covering portion is located outside the hollow column and covers the end surface, and when the second connecting portion rotates relatively to the first connecting portion, the kinetic friction is generated between the covering portion and the end surface.

5. The hinge structure of claim 1, wherein the first bracket and the second bracket are pivoted with each other through the hinge along a first rotation axis, the first connecting portion is rotatably connected to the second connecting portion along a second rotation axis, and the first rotation axis is parallel to the second rotation axis.

6. An electronic device comprising:
a first body and a second body; and
a hinge structure comprising:
a hinge;
a first bracket and a second bracket pivoted with each other through the hinge and fixed respectively to the first body and the second body, wherein the second bracket has a first connecting portion; and
a third bracket fixed to the second body and having a second connecting portion, wherein the second connecting portion is rotatably connected to the first connecting portion, and when the second body receives a force and wobbles relatively to the first body, the second connecting portion is adapted to rotate relatively to the first connecting portion to a limited extent, so that a wobbling kinetic energy of the second body is consumed by a kinetic friction of relative rotation between the first connecting portion and the second connecting portion;
wherein the second bracket has a first fixing portion and is fixed directly to the second body through the first fixing portion, the third bracket has a second fixing portion and is fixed directly to the second body through the second fixing portion, and the first connecting portion and the second connecting portion are located between the first fixing portion and the second fixing portion.

7. The electronic device of claim 6, wherein one of the first connecting portion and the second connecting portion comprises a hollow column, another one of the first connecting portion and the second connecting portion comprises a pillar, the pillar is rotatably inserted through the hollow column and in contact with an inner wall of the hollow column, and when the second connecting portion rotates relatively to the first connecting portion, the kinetic friction is generated between the inner wall and the pillar.

8. The electronic device of claim 7, wherein the hollow column has a slot, and the slot exposes a portion of the pillar.

9. The electronic device of claim 7, wherein the hollow column has an end surface perpendicular to the inner wall, the pillar has an end having a covering portion, the covering portion is located outside the hollow column and covers the end surface, and when the second connecting portion rotates relatively to the first connecting portion, the kinetic friction is generated between the covering portion and the end surface.

10. The electronic device of claim 6, wherein the first bracket and the second bracket are pivoted with each other through the hinge along a first rotation axis, the first connecting portion is rotatably connected to the second connecting portion along a second rotation axis, and the first rotation axis is parallel to the second rotation axis.

11. The electronic device of claim 6, wherein a distance between the second connecting portion and the first fixing portion is shorter than a distance between the second connecting portion and the second fixing portion.

12. The electronic device of claim 6, wherein the second body has a top side and a bottom side opposite to each other, the first fixing portion, the first connecting portion and the second connecting portion are adjacent to the bottom side, and the second fixing portion is adjacent to the top side.

* * * * *